United States Patent Office 3,567,527
Patented Mar. 2, 1971

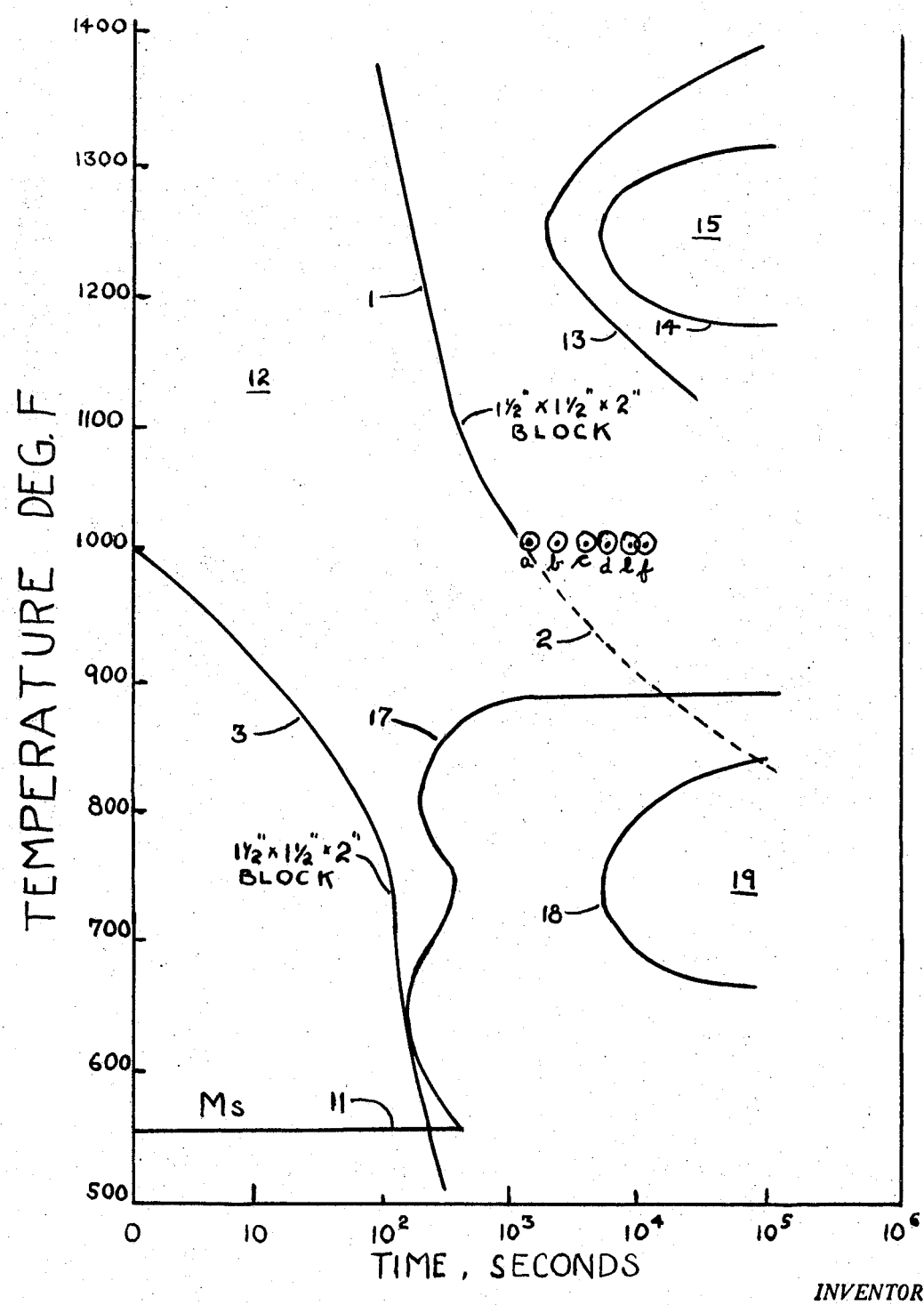

3,567,527
METALLURGICAL PROCESS AND PRODUCT
Maxwell Pevar, Philadelphia, Pa.
(551 Shoemaker Road, Elkins Park, Pa. 19117)
Continuation of application Ser. No. 497,926, Oct. 19, 1965. This application Dec. 16, 1968, Ser. No. 794,835
Int. Cl. C21d 1/00
U.S. Cl. 148—127                                    14 Claims

ABSTRACT OF THE DISCLOSURE

This application discloses a method for heat treating metals of the class which is characterized by having a time-temperature-transformation, or T-T-T diagram wherein there is a high temperature long-time transformation region spaced above a low temperature short-time transformation region, the treatment being conducted in a manner to avail of the intermediate region between the high temperature transformation region and the low temperature transformation region and minimize quenching stresses, distortion, residual stresses, and cracking; also welding, when desired, in the intermedate region to produce homogeneous welded objects without special after-weld treatments; also the improved product of the heat-treatment process.

---

This application is a continuation of application Ser. No. 497,926, filed Oct. 19, 1965, now abandoned.

The present invention relates to a metallurgical process and product, especially to a method for heat treating metal objects or bodies in a manner to minimize quenching stresses, distortion, residual stresses, and cracking by taking advantage of an elevated region depicted in the time-temperature-transformation diagram (herein called the T-T-T diagram) where very long holding times are permissible with little or no isothermal phase transformation products in the object or body upon cooling from this region.

One example of such an object or body is D6AC alloy steel, and the heat treatment of this steel will be used herein as an example for the application of the invention. Other objects or bodies having a similar T-T-T diagram may very well be suited for heat treatment by the present process. D6AC alloy steel is a development by Ladish Company, Cudahy, Wis. It has a chemical composition similar to AISI 4340 steel except for slight modifications which permit the steel to achieve high strength levels in the order of 200,000 to 260,000 p.s.i. ultimate strength and still retain considerable fracture toughness whereby the steel is used in a number of rocket motor case applications, for landing gears and other uses requiring such properties. A typical analysis of this steel is: carbon 0.46, manganese 0.85, silicon 0.027, phophorous 0.005, sulfur 0.001, chrominum 1.120, nickel 0.67, molybdenum 1.08, and vanadium 0.12, all by weight percent.

However, a number of problems exist in producing crack-free rocket motor casings with this steel with controllable distortion and dimensional tolerances. The larger the casings the greater the tendency toward these problems. These manufacturing difficulties are even greater when case segments are joined by welding to form larger end products. In fabricated casings the welding cycle must be controlled as well as the subsequent heat treatment. Stresses from welding and from subsequent heat treatments alone are believed to contribute to uncontrollable dimensional changes, micro cracks, quench cracks, and crack propagation.

Attempts have been made to minimize these problems and to improve the toughness of this and other steels by modifying conventional heat treatments. In rocket motor case applications this steel is in the best strength-toughness combination when its micro structure is tempered martensite. Less favored structures in decreasing order of toughness for a comparable strength level are: (1) a mixture of tempered martensite with some lower bainite, (2) lower bainite, (3) a mixture of tempered martensite with upper bainite, (4) upper bainite, and (5) mixtures of tempered martensite, bainite, and pearlite. In this specification the definitions of these microstructures are as defined in "Structures and Properties of Alloys," by Brick and Phillips, Metallurgy and Metallurgical Engineering Series, second edition, 1949, Mc-Graw-Hill Book Co. In this specification T-T-T diagrams used are those depicted in the "1953 Supplement to the Atlas of Isothermal Transformation Diagrams," United States Steel Corp., Pittsburgh, Pa.

The conventional method for hardening medium carbon alloy steels by heat treatment is to heat to the austenitizing temperature, holding as long as required for the mass being treated, and quenching into a quenching medium wherein the cooling rate will be fast enough to avoid any isothermal phase transformation which occurs between the austenitizing temperature and the temperature of the quenching medium, such as oil or water. The steel is then tempered once or twice to soften it to a useful strength level with suitable toughness. The treatment results in tempered martensite. The hardening heat treatment of D6AC steel for rocket motor casings requires a modified treatment to reduce the aforesaid difficulties. One such treatment generally used is as follows: The object or body is program heated to 1650 deg. F. in a protective atmosphere furnace, held for sufficient time, quenched into a 400 deg. F. salt bath, held until center and surface are about 400 deg. F., removed from the salt, and still-air-cooled to room temperature, immediately placed in the 400 deg. F. salt bath furnace, tempered for two hours (for a 0.125" thick case, for example), removed from the furnace and cooled to room temperature, and subsequently tempered at 650 deg. F., and finally tempered at approximately 1150 deg. F. for a Titan casing and at a lower temperature for Minuteman casings. The final tempering is usually effected with the casing in special fixtures to control inside diameter dimensions. Often more than one final temper is employed. Variations in chemical analysis from heat to heat require variations in the tempering temperatures. In this heat treatment the 400 deg. F. temper is required to reduce crack formation because of the drastic quench from 1650 deg. F. into the lower temperature salt. A delay in tempering after the quench often results in delayed micro crack formation, wherefore the need for the 400 deg. F. temper immediately after the quench. The length of time object or body remains in this 400 deg. F. salt bath quench is also critical and the object must be removed immediately after it cools to this temperature or cracks results. A protective atmosphere or environment is one in which the body is heat-treated at elevated temperatures in a neutral, inert, vacuum, or slightly reducing environment, the effect being to prevent harmful oxidation, carburization, or decarburization.

The complexity of this modified treatment is quite apparent and the treatment is also expensive and, even so, has not been successful in eliminating the problems of dimensional control and micro crack formation associated with the formation of high residual stresses during various steps of the process. In addition to the existing problems with D6AC steel rocket motor casings, many other objects of this steel and other alloys require improved heat treatments. The extent of the need for improving properties and overcoming these problems is further illustrated in DMIC Report 119, Nov. 27, 1959, "Heat Treatment of High Strength Steels for Airplane Applications," Defense Materials Information Center, Battelle Memorial Institute, Columbus 1, Ohio.

SUMMARY OF INVENTION

One object of the present invention is to provide a heat treatment which reduces the residual stresses formed in the object or body during each step of the heat treatment and in the object or body after the heat treatment is completed by utilizing a region depicted in the T-T-T diagram for the object or body of D6AC steel existing between 950 deg. F. and 1050 deg. F., a region where long times are permissible without formation of detrimental isothermal transformation phases.

Another object of the invention is to provide a means whereby objects or bodies with wall thickness or mass larger than before are heat treatable with the same or greater toughness for the same strength level.

Another object of the invention is to reduce distortion during heat treatment by interrupting the quenching operation to allow the object or body to achieve thermal equilibrium between center and surface before cooling down through the martensite formation region.

Another object is to provide a heat treatment which permits cooling in air from a region above the start of bainite transformation to room temperature during the quenching cycle, resulting in an object or body which is totally martensite with little or no lower bainite and containing no upper bainite, thereby being useful for applications such as rocket motor cases.

Another object is to permit quenching into a fast cooling medium, such as salt, oil, or water from the arrest region above the bainite formation region to permit the processing of objects of larger size or mass than possible with air or gas cooling.

Another object is to allow holding times beyond that for equilibrium of surface and center of the object or body within the region which permits long time holding without formation of isothermal transformation products, and provides maximum stress relief benefits during the quench from its austenitizing temperature.

Another object is to utilize this region depicted on the T-T-T diagram during ausforming to hold the object beyond the time for forming operation so as to permit the steel to come to thermal equilibrium between surface and center and times beyond that for thermal equilibrium to gain the benefits of stress relief provided by this treatment prior to cooling down to room temperatures.

Another object is to utilize the desired region depicted on the T-T-T diagram of the D6AC type alloys to stress relieve welded regions during the joining of components of these alloys by arresting the cooling of the weld region immediately after the passing of the welding rod or electrode, at temperatures within this region for long time exposure without phase transformation and holding for times beyond that for the weld metal and heat affected zone to achieve the holding temperature prior to cooling down to room temperature. It may be necessary with some alloys to have the weld metal of the same alloy as the base metal to utilize the advantages of the invention for best results.

The above and other objects of the invention as well as various novel features and advantages, will be apparent from the following description of an exemplary embodiment which is illustrated in the accompanying drawings, in which:

DRAWINGS

The single figure is an equilibrium T-T-T diagram for D6AC steel as presented by a steel supplier.

SPECIFIC DESCRIPTION

In the diagram, field 12 is the region where austenite exists upon cooling D6AC steel from its austenitizing temperature; line profile 13 is the beginning of pearlite formation; line profile 14 is the completion of pearlite formation; field 15 is the pearlite field; line profile 17 is the beginning of bainite formation; line profile 18 is the completion of bainite formation; and field 19 is the bainite field. Curves 1 and 3 are experimental cooling curves obtained with 1½" x 1½" x 2" D6AC blocks of steel and are superimposed on the T-T-T diagram for this steel. Curve 2 is an imaginary curve superimposed on the diagram.

Upon cooling this steel from its austenitizing temperature and arresting the cooling of the object at 1300 deg. F., pearlite will form after long holding times. With faster cooling from the austenitizing temperature, this pearlite transformation is avoided. In general steel hardening practices, cooling rates for the mass and chemistry of the object being hardened are selected to avoid pearlite and bainite formation since they reduce the desired properties of the steel. The end product in this case is martensite, a body-centered tetragonal structure which has excellent strength and toughness properties upon subsequent tempering. In other words, the steel will form martensite upon cooling to room temperature provided lines 13 and 17 are not traversed. Martensite starts to form as line 11 is traversed by the steel, although completion of the martensite transformation takes place at a lower temperature. This transformation from austenite to martensite is accompanied by a volume change which induces residual stresses in the steel. When steel will not readily yield and these stresses are sufficiently high, micro cracks will form.

According to the diagram of the drawing, the steel must cool very quickly below 600 deg. F. if upper bainite formation is to be avoided. This fast quench causes a spread in temperature (gradient) from surface to center of the object during the quench. The larger the object and the thicker its wall, in the case of a hollow cylinder, the greater this temperature gradient. In the commercial heat treatment of Minuteman and Titan rocket motor cases made from D6AC steel, a tempered martensite structure is achieved by quenching the object from its austenitizing temperature into a 400 deg. F. salt bath, cooling to room temperature, and tempering to 400 deg. F. initially and subsequently at higher tempering temperatures.

The present invention utilizes the portion of field 12 between 900 and 1100 deg. F. where the steel is held for long times after being austenitized and cooling to said temperature region, and subsequently being cooled at a desired rate to room temperature without formation of upper bainite. D6AC steel blocks 1½" x 1½" x 2" were heat treated in this manner by austenitizing at 1650 deg. F. and then transferring them to a holding furnace set for 950 deg. F. The cooling curve obtained by this treatment is depicted by curve 1. Extended holding times in this region, beyond the time required for temperature equalization between the surface and the center of the object, are depicted by specimens a, b, c, d, e, and f.

It was theorized that negligible nucleation for phase transformation occurs in this region during time for thermal equilibrium between surface and center and much longer times, and with sufficient cooling rate, to avoid bainite formation by not traversing line profile 17, martensite is formed. It is therefore justified to assume that the cooling curve from the holding region is depicted to start at zero time as shown by curve 3. Actually, the end product from this treatment has the properties and microstructure of tempered martensite.

It was not apparent to those well versed in the art of steel heat treating that steel could be hardened in this manner and still achieve the strength and microstructure required for rocket motor cases. According to the old art, D6AC steel, when arrested at 1000 deg. F., is expected to follow the cooling curve depicted by the imaginary curve 2 on the T-T-T diagram and thereby would pass into the upper bainite region whether quenched in air or liquid. In contrast to this supposition, the blocks of D6AC steel did not form any upper bainite after holding times up to 4 hours in this region, and hardness levels throughout the mass of steel blocks were suitable for rocket motor case applications. Nor was there retained austenite, as determined by X-ray diffraction techniques. The fear of forming excessive amounts of retained austenite by delayed quenching has also been a deterrent to the heat treatment covered in the present invention. In tool steel technology, the elimination of retained austenite has been and still is a major factor in designing a hardening heat treatment cycle. It is believed that a family of tool steels having the characteristic T-T-T diagram displayed by D6AC are potential steels for the present invention.

It is also likely that a number of existing alloys can be modified chemically to take advantage of the present invention and that new steel or other alloy developments will be designed to produce alloys with T-T-T diagrams similar to that described herein so that they make take advantage of the benefits of the invention.

Another advantage of the present invention is that larger and thicker-walled objects will be heat treatable to higher hardness levels than are now possible since the only cooling rate of major concern is now that from the arrest region to the temperature below that of the bainite nose. In the case of D6AC, the steel must cool from between 900 to 1000 deg. F. to about 500 deg. F. without traversing line profile 17.

The present invention is not to be confused with austempering which is a commercial heat treatment designed to reduce distortion in a grade of steels by intentionally producing a lower bainite structure by arresting the action upon cooling the steel from its austenitizing furnace to a temperature just above the MS. This austempering treatment is described in the Metals Handbook, vol. 2, 1964, published by The American Society for Metals, Metals Park Ohio. After arresting the steel above the MS it is held there until it transforms isothermally to bainite and is then cooled to room temperature. For most steels, the arrest temperature in this case is 500 to 700 deg. F. This treatment is believed to be inferior to that of the present invention since the quench from the austenitizing temperature to the arrest temperature is much more drastic and the bainite structure formed is inferior for rocket motor case applications. Thirdly, larger mass objects are heat treatable with the present process since cooling from about 1000 deg. F. to 500 deg. F. is more easily accomplished than cooling from 1650 deg. F. to 500 to 700 deg. F. as required in austempering, the idea being to avoid the formation of upper bainite in amounts that would be detrimental to the steel.

As previously mentioned, the present invention can be used in conjunction with other industrial processes to provide technical improvements and economic benefits not otherwise obtainable. In ausforming, the object is heated to the austenitizing temperature, cooled to a lower temperature within the austenite field of the T-T-T diagram, and is formed, rolled, or otherwise worked before phase transformation takes place. The object is then cooled to room temperature and hardened in a conventional manner at some later step in the operation. For objects such as D6AC steel the "working" can be accomplished at the arrest temperature stipulated in this invention and held at this temperature for extended times beyond that for thermal equilibrium to gain the benefits of being stress relieved prior to subsequent cooling down to room temperature and at a cooling rate designed to miss the upper bainite nose. Subsequent tempering may be used if the hardness of the object is too great for subsequent processing or for the end use of the object.

The process of the present invention may also be incorporated into welding cycles where the preheat temperature is to be in the region, between 900 deg. F. to 1100 deg. F. for D6AC, wherein the weld metal and heat-affected zone, upon cooling from the welding temperature, is arrested and held for extended times within this region, thereby reducing residual stresses and chances for micro crack formation resulting from the welding. The preheat temperature would, in this case, function as a post heat and also prevent formation of isothermal transformation phases and upon cooling to room temperature a "self-tempered" martensitic structure will be present in the object so long as the object is within the mass requirements for the cooling rate used to cool the object to room temperature after the welding is completed. It may be required to use automatic welding processes to utilize this method, as a practical matter, since the arrest region temperature may be prohibitive for manual operation if the operator is not adequately protected from the heat.

The above-mentioned examples of the applications of the invention are in no way meant to limit its uses, which will become apparent to those skilled in the art. A number of non-ferrous alloys which undergo similar phase transformations to those of steel may derive benefits from the invention and are meant to be included. High alloyed aluminum-bronze, and brasses may fit this category.

It appears feasible from experimental results obtained to date that in many cases, objects treated in accordance with the present process, may be suitable for use immediately after being cooled from the arrest temperature during the quenching operation without the need for subsequent tempering treatments, for indications are such that in the case of D6AC steel the end product of the invention is a "self-tempered" martensite of high hardness and ductility and reduction in area when evaluated by hardness and tensile testing.

While one embodiment of the invention and certain applications have been specifically described for purposes of illustration, it is to be understood that there may be various embodiments and modifications within the general scope of the invention.

What is claimed is:

1. The method of heat treating alloy steel objects having a composition containing chromium, molybdenum, nickel, vanadium, in one or more combinations and in other elemental compositions producing a time-temperature-transformation or T-T-T diagram characterized by a high temperature transformation pearlitic region and a low temperature transformation bainitic region, said high temperature transformation pearlitic region being situated above the nose of the lower temperature transformation baintic region, which comprises: heating the object to its austenitizing temperature above that at which iso-thermal transformation takes place and holding until fully austenitized, cooling the object clear of the high temperature pearlitic region to an intermediate temperature austenitic region which is above the low temperature transformation bainitic region, said intermediate being in the range of about 900° F. to about 1100° F., holding the object in this region until temperature equilibrium betewen surface and center of the object is substantially complete but for a time shorter than that required for object to a temperature below the lower temperature transformation bainitic region, which is at the start of martensitic formation, whereby to produce an alloy steel object of the type specified which is composed largely of ductile martensite and other low temperature phases, which is substantially free from austenite and higher bainite, and which has a very low residual hardening treatment stresses and cracks, in a single continuous treatment.

2. The heat treatment according to claim 1, which further comprises: conducting the austenitizing treatment in an oxidation inhibiting environment, arresting the treatment by transferring the object from the austenitizing temperature environment into a holding temperature environment in the intermediate temperature region while protected from oxidation and maintaining it until temperature equilibrium between surface and center of the object is reached, removing the object from said temperature holding environment, and cooling the object in air to a temperature below the lower temperature transformation bainitic region, whereby a temperable product is produced.

3. The heat treatment according to claim 1, further characterized by the fact that the heat input is terminated after temperature equilibrium is reached, and providing the final cooling by an oxidation inhibiting gas.

4. The heat treatment according to claim 1, further characterized by the fact that the object is removed from the holding temperature environment after temperature temperature equilibrium is reached, and providing the final cooling by a quenching bath of oil, salt, and the equivalent.

5. The method of heat treating as set forth in claim 1, which further comprises, subsequently tempering the object, by reheating the desired tempering temperature.

6. The method as set forth in claim 1, in which the alloy steel has a nominal composition of about carbon 0.46%, manganese 0.85%, silicon 0.27%, phosphorus 0.005%, sulfur 0.001%, chromium 1.120%, nickel 0.67%, molybdenum 1.08%, vanadium 0.12%, balance iron, all by weight and known as D6AC alloy steel, and in which the object is heated to about 1650 deg. F., and quenched to about 900 to 1100 deg. F., and held in the intermediate temperature region before final cooling.

7. The method of heat treating alloy steel objects having a composition containing chromium, molybdenum, nickel, vanadium, in one or more combinations and in other elemental compositions producing a time-temperature-transformation or T-T-T diagram characterized by a high temperature transformation pearlitic region and a low temperature transformation bainitic region, said pearlitic region being above the nose of the bainitic region, which comprises: heating the object to its austenitizing temperature above that at which isothermal transformation takes place, holding until fully austenitized, cooling the object clear of the high temperature transformation pearlitic region to an intermediate temperature austenitic region, said intermediate temperature being in the range of about 900° F. to about 1100° F., which is above the low temperature transformation bainitic region, holding the object in this region until temperature equilibrium between the surface and center of the object is substantially complete and for an additional time up to about 4 hours sufficient to obtain thermal stress relief and other temperable effects, but for a time shorter than that required for phase transformation to be reached, and cooling the object to a temperature below the lower temperature transformation bainitic region and below the start of martensitic transformation, whereby to produce an alloy steel of the type specified which is composed of martensite and other low temperature phases, which is substantially free from austenite and higher bainite, and which has very low residual hardening treatment stresses and cracks, in a single continuous treatment.

8. The method of heat treating alloy steel objects as set forth in claim 7, further characterized by the fact the austenitizing treatment is conducted in an oxidation inhibiting environment.

9. The method of heat treating alloy steel objects as set forth in claim 7, further characterized by the fact that the heat input is terminated after the thermal arrest is complete, and providing the final cooling by an oxidation inhibiting gas.

10. The method of heat treating alloy steel objects as set forth in claim 7, further characterized by the fact that the object is removed from the holding temperature environment between the upper pearlitic region and the lower bainitic region, and providing the final cooling by a bath of oil, salt and the equivalent.

11. The method of heat treating alloy steel objects as set forth in claim 7, which further comprises, subsequently tempering the object, by reheating it to the desired tempering temperature.

12. The method of heat treating alloy steel objects as set forth in claim 7, in which the alloy steel has a nominal composition of about carbon 0.46%, manganese 0.85%, silicon 0.27%, phosphorus 0.005%, sulfur 0.005%, chromium 1.120%, nickel 0.67%, molybdenum 1.08%, vanadium 0.12%, balance iron, all by percent weight and known as D6AC alloy steel, and in which the object is heated to about 1650 deg. F. and held in the intermediate temperature region before final cooling.

13. The method of treating alloy steel objects having a composition containing chromium, molybdenum, nickel, vanadium, in one or more combinations, and in other elemental compositions producing a time-temperature-transformation or T-T-T diagram characterized by a high temperature transformation pearlitic region and a low temperature transformation bainitic region, said pearlitic region being situated above the nose of the bainitic region, which comprises: heating a plurality of components of said alloy steel to the austenitizing temperature, cooling them in the austenitizing range to an intermediate region between the pearlitic and bainitic regions said intermediate temperature region being between about 900° F. and about 1100° F., welding the components while they are in the austenitic state in said intermediate region, holding the welded components in the intermediate region for a time short enough to prevent isothermal phase transformation, and cooling at a rate to avoid the nose of the upper bainitic region, whereby to produce a welded article of the type of alloy specified which is composed largely of martensite and other low temperature phases, which is substantially free from austenite and higher bainite, and which has very low residual hardening stresses and cracks.

14. As an article of manufacture, a welded article of a heat-treated alloy steel produced by the method of claim 13.

References Cited

UNITED STATES PATENTS 2,934,463 4/1960 Schmatz et al.
3,103,065 9/1963 Rectenwald _____ 148—127X

OTHER REFERENCES

Ladish D6AC, Bulletin No. MET–6239, March 1963, 9 pages.

Dictionary of Metallurgy, Merriman, McDonald and Evans Ltd. London, 1958, relied on page 180.

Metals Handbook, 1948, ed., published by ASM, relied on pages 295 and 296.

CHARLES N. LOVELL, Primary Examiner

U.S. Cl. X.R.

148—34, 143, 144